US012566541B2

(12) United States Patent
Peart et al.

(10) Patent No.: US 12,566,541 B2
(45) Date of Patent: Mar. 3, 2026

(54) RECONFIGURABLE DASHBOARD WITH MOVEABLE MODULES

(71) Applicant: The Toronto-Dominion Bank, Toronto (CA)

(72) Inventors: Andrew Peart, Toronto (CA); Dean Sheppard, Toronto (CA); Geeth Bandi, Toronto (CA); Prasad Koila, Toronto (CA); Gaurav Rajderkar, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 112 days.

(21) Appl. No.: 18/463,131

(22) Filed: Sep. 7, 2023

(65) Prior Publication Data

US 2025/0085837 A1 Mar. 13, 2025

(51) Int. Cl.
*G06F 3/04845* (2022.01)
*G06F 9/451* (2018.01)

(52) U.S. Cl.
CPC .......... *G06F 3/04845* (2013.01); *G06F 9/451* (2018.02)

(58) Field of Classification Search
CPC ............................. G06F 3/04845; G06F 9/451
See application file for complete search history.

(56) References Cited

U.S. PATENT DOCUMENTS 7,272,820 B2 9/2007 Klianev
7,721,303 B2 * 5/2010 Alves de Moura ....... G06F 8/38 709/202
7,805,325 B2 9/2010 Rits et al.
8,468,529 B2 6/2013 Mohanty et al.
8,521,857 B2 8/2013 Maxwell et al.
8,542,108 B1 9/2013 Izdepski et al.
8,776,053 B2 7/2014 Lagergren et al.
8,849,691 B2 9/2014 Sanabria et al.
9,088,516 B2 7/2015 Vachharajani et al.
9,391,951 B2 7/2016 Bemmel
9,852,220 B1 12/2017 Guo et al.
9,853,742 B1 12/2017 Radosevic et al.
9,864,982 B2 1/2018 Bristow et al.
9,971,618 B2 5/2018 Lagergren et al.
10,135,706 B2 11/2018 Basile et al.
10,163,085 B2 12/2018 D'Agostino et al.
(Continued)

OTHER PUBLICATIONS

Chan, et al. "Designing a credit approval system using web services, BPEL, and AJAA." 2009 IEEE International Conference on e-Business Engineering. IEEE, pp. 287-294 (Year: 2009).
(Continued)

*Primary Examiner* — Tadesse Hailu

(57) ABSTRACT

An example operation may include one or more of logging in a device with a software application, displaying a dashboard of the software application on the device, wherein the dashboard comprises a plurality of movable display modules with different display content enclosed therein, respectively, receiving a command via the dashboard to reconfigure a position of a movable display module within the dashboard from among the plurality of movable display modules, and modifying the position of the movable display module to a different position within the dashboard based on position information included in the received command to generate a reconfigured dashboard.

20 Claims, 13 Drawing Sheets

(56) References Cited

U.S. PATENT DOCUMENTS 10,178,246 B1 1/2019 Horvath et al.
10,181,114 B2 1/2019 Tseretopoulos et al.
10,203,941 B1 2/2019 Swiecki et al.
10,339,931 B2 7/2019 Tseretopoulos et al.
10,346,824 B2 7/2019 Chan et al.
10,360,303 B2 7/2019 Volkovs et al.
10,402,756 B2 9/2019 Maguire
10,405,146 B1 9/2019 Kuruvilla et al.
10,438,206 B2 10/2019 Jivraj et al.
10,440,196 B2 10/2019 Horvath et al.
10,440,197 B2 10/2019 Horvath et al.
10,460,748 B2 10/2019 Tseretopoulos et al.
10,467,568 B1 11/2019 Robbins et al.
10,482,675 B1 11/2019 Sutter et al.
10,659,400 B2 5/2020 Moon et al.
10,698,902 B2 6/2020 Tseretopoulos et al.
10,706,635 B2 7/2020 Sutter et al.
10,708,721 B2 7/2020 Kuruvilla et al.
10,728,259 B2 7/2020 McCarter et al.
10,776,619 B2 9/2020 Collinson et al.
10,824,941 B2 11/2020 Volkovs et al.
10,831,923 B2 11/2020 Dunjic et al.
10,832,047 B2 11/2020 Moghtadai
10,862,897 B2 12/2020 D'Agostino et al.
10,867,292 B2 12/2020 Lin et al.
10,867,293 B2 12/2020 Bristow et al.
10,878,816 B2 12/2020 Tseretopoulos et al.
10,902,220 B2 1/2021 Lozon et al.
10,922,665 B2 2/2021 Miller et al.
10,943,605 B2 3/2021 Tseretopoulos et al.
10,977,617 B2 4/2021 Tseretopoulos et al.
11,004,187 B2 5/2021 Kuruvilla et al.
11,017,028 B2 5/2021 Dunjic et al.
11,030,415 B2 6/2021 Volkovs et al.
11,055,924 B2 7/2021 Navarro et al.
11,061,638 B2 7/2021 Lam
11,070,448 B2 7/2021 Miller et al.
11,074,531 B2 7/2021 Prasad et al.
11,087,314 B2 8/2021 Gandhi et al.
11,100,168 B2 8/2021 Miller et al.
11,140,143 B2 10/2021 Moon et al.
11,144,921 B2 10/2021 Dunjic et al.
11,144,998 B2 10/2021 Kuruvilla et al.
11,145,169 B2 10/2021 Pratten et al.
11,159,405 B2 10/2021 Basile et al.
11,182,860 B2 11/2021 Kuruvilla et al.
11,200,328 B2 12/2021 Shpurov et al.
11,200,411 B2 12/2021 Rizvi et al.
11,206,189 B2 12/2021 Asbi et al.
11,210,857 B2 12/2021 Rizvi et al.
11,222,286 B2 1/2022 Choe et al.
11,232,304 B2 1/2022 Navarro et al.
11,276,257 B2 3/2022 Moghtadai et al.
11,303,642 B2 4/2022 Dunjic et al.
11,334,574 B2 5/2022 Caputo et al.
11,347,744 B2 5/2022 Tseretopoulos et al.
11,349,871 B2 5/2022 Moon et al.
11,354,442 B2 6/2022 Haldenby et al.
11,361,566 B2 6/2022 Collinson et al.
11,373,229 B2 6/2022 Tseretopoulos et al.
11,392,776 B2 7/2022 Lozon et al.
11,393,020 B2 7/2022 Mathew et al.
11,394,668 B1 7/2022 Subbunarayanan et al.
11,397,765 B2 7/2022 Volkovs et al.
11,409,811 B2 8/2022 D'Agostino
11,411,734 B2 8/2022 Shpurov et al.
11,430,242 B2 8/2022 Moghtadai
11,436,809 B2 9/2022 Rizvi et al.
11,451,669 B1 9/2022 Navarro et al.
11,455,295 B2 9/2022 Alroqaie
11,469,878 B2 10/2022 Shpurov et al.
11,470,091 B2 10/2022 McCarter et al.
11,470,143 B2 10/2022 Joheb et al.
11,475,059 B2 10/2022 Liu et al.
11,475,251 B2 10/2022 Morin et al.
11,477,265 B2 10/2022 McPhee et al.
11,487,573 B2 11/2022 Parikh et al.
11,507,622 B2 11/2022 Grebenisan et al.
11,507,868 B2 11/2022 Kwong et al.
11,546,345 B2 1/2023 D'Agostino et al.
11,550,443 B1 1/2023 Sivadas et al.
11,580,762 B2 2/2023 Rizvi et al.
11,600,064 B2 3/2023 Navarro et al.
11,604,899 B2 3/2023 Haldenby et al.
11,620,741 B2 4/2023 Kuruvilla et al.
11,632,311 B2 4/2023 Miller et al.
11,651,100 B2 5/2023 Dunjic et al.
11,663,488 B2 5/2023 Volkovs et al.
11,663,555 B2 5/2023 Alabdrabalnabi et al.
11,671,536 B2 6/2023 Navarro et al.
11,687,995 B2 6/2023 Tseretopoulos et al.
11,689,484 B2 6/2023 Moon et al.
11,704,782 B2 7/2023 Wakim et al.
11,741,305 B2 8/2023 Skaljin et al.
11,743,210 B2 8/2023 Moon et al.
11,748,400 B2 9/2023 Volkovs et al.
11,756,388 B2 9/2023 Pratten et al.
11,777,918 B2 10/2023 Moon et al.
11,782,935 B2 10/2023 Caputo et al.
11,789,909 B2 10/2023 Grebenisan et al.
11,790,012 B2 10/2023 D'Agostino
11,790,354 B2 10/2023 Gandhi et al.
11,797,962 B2 10/2023 Jones et al.
11,809,486 B2 11/2023 Liu et al.
11,809,577 B2 11/2023 Begg et al.
11,811,826 B2 11/2023 Moon et al.
11,842,252 B2 12/2023 Kuang et al.
11,875,398 B2 1/2024 Pratten et al.
11,880,811 B2 1/2024 Pawelkiewicz et al.
11,886,764 B2 1/2024 Lam
11,922,510 B1 3/2024 Konson et al.
11,928,112 B2 3/2024 Dunjic et al.
11,941,525 B2 3/2024 Morin et al.
11,941,703 B2 3/2024 Kuruvilla et al.
11,955,117 B2 4/2024 McDermid et al.
11,966,491 B2 4/2024 D'Agostino
11,978,085 B2 5/2024 Rai et al.
11,978,090 B2 5/2024 Navarro et al.
11,985,153 B2 5/2024 Karl
11,995,121 B2 5/2024 Volkovs et al.
12,008,315 B2 6/2024 Miller et al.
12,014,303 B2 6/2024 Carvalho et al.
12,019,594 B2 6/2024 Floyd et al.
12,021,874 B2 6/2024 Dunjic et al.
12,039,535 B2 7/2024 Dunjic et al.
12,052,363 B2 7/2024 Shpurov et al.
12,061,652 B2 8/2024 Miller et al.
12,067,130 B2 8/2024 Shpurov et al.
12,067,580 B2 8/2024 Jeske et al.
12,079,351 B2 9/2024 Begg et al.
12,106,220 B2 10/2024 Volkovs et al.
12,111,793 B2 10/2024 Grebenisan et al.
12,124,925 B2 10/2024 Rho et al.
12,136,079 B2 11/2024 Jones et al.
12,164,542 B1 12/2024 Rahman et al.
12,169,693 B2 12/2024 Lu
12,182,800 B2 12/2024 Navarro et al.
12,198,109 B2 1/2025 Abbas
12,198,510 B2 1/2025 Pratten et al.
12,210,534 B2 1/2025 Cashion et al.
12,211,274 B2 1/2025 Ma et al.
12,217,011 B2 2/2025 Luo et al.
12,223,549 B2 2/2025 Bouëttéet al.
12,229,690 B2 2/2025 Stanevich et al.
2001/0023414 A1* 9/2001 Kumar .................. G06Q 10/06 708/170
2004/0199541 A1* 10/2004 Goldberg ............... G06Q 30/00
2009/0021486 A1 1/2009 Chaudhri et al.
2009/0106757 A1 4/2009 Kawajiri
2009/0190171 A1 7/2009 Nemoto
2010/0223623 A1 9/2010 Strong et al.
2011/0153458 A1 6/2011 Wong et al.
2011/0252397 A1 10/2011 Hong et al.
2011/0282707 A1 11/2011 Rangaswamy et al.

(56) References Cited

U.S. PATENT DOCUMENTS

2012/0227044 A1 9/2012 Arumugham et al.
2012/0227060 A1 9/2012 Allen et al.
2013/0254262 A1 9/2013 Udall
2014/0108936 A1* 4/2014 Khosropour ........ H04L 41/0803 715/735
2014/0181676 A1 6/2014 Samborskyy et al.
2014/0258849 A1* 9/2014 Chung .................. G06F 40/106 715/243
2015/0153918 A1 6/2015 Chen et al.
2015/0161546 A1 6/2015 Stoyanov
2015/0310390 A1 10/2015 Steele et al.
2016/0246490 A1 8/2016 Cabral
2016/0357358 A1* 12/2016 Forster ................ G06F 3/04845
2017/0039046 A1 2/2017 Henke et al.
2017/0270440 A1 9/2017 Garcia et al.
2017/0372442 A1 12/2017 Mejias
2018/0034913 A1* 2/2018 Matthieu ................. H04L 67/52
2018/0059919 A1* 3/2018 Wan .................... G06F 3/04845
2018/0268818 A1 9/2018 Schoenmackers et al.
2019/0172045 A1 6/2019 Dunjic et al.
2019/0372852 A1 12/2019 Aparicio et al.
2020/0058068 A1 2/2020 Gandhi et al.
2020/0394688 A1 12/2020 Loflin et al.
2021/0027160 A1 1/2021 Volkovs et al.
2021/0037040 A1 2/2021 Aleks et al.
2021/0117893 A1 4/2021 Sohum et al.
2021/0133867 A1 5/2021 Greenberg et al.
2021/0216359 A1 7/2021 Rana et al.
2021/0232950 A1 7/2021 Kono
2021/0264461 A1 8/2021 Fam
2021/0342522 A1* 11/2021 Khorana ............... H04L 67/561
2021/0407016 A1 12/2021 Kuruvilla et al.
2022/0058489 A1 2/2022 Volkovs et al.
2022/0108069 A1 4/2022 Lee
2022/0114224 A1 4/2022 Thangeswaran et al.
2022/0157094 A1 5/2022 Moghtadai et al.
2022/0172083 A1 6/2022 Wu et al.
2022/0188705 A1 6/2022 Davoodi et al.
2022/0198411 A1 6/2022 Jones et al.
2022/0198432 A1 6/2022 Jones et al.
2022/0198445 A1 6/2022 Jones et al.
2022/0207295 A1 6/2022 Stanevich et al.
2022/0207430 A1 6/2022 Dickie et al.
2022/0207432 A1 6/2022 Whelan et al.
2022/0207606 A1 6/2022 Dickie et al.
2022/0214911 A1 7/2022 Scarfutti et al.
2022/0245060 A1 8/2022 Kathuria et al.
2022/0270155 A1 8/2022 Volkovs et al.
2022/0277213 A1 9/2022 Braviner et al.
2022/0277227 A1 9/2022 Yu et al.
2022/0277323 A1 9/2022 Whelan et al.
2022/0284450 A1 9/2022 Asta et al.
2022/0292372 A1 9/2022 Joshy et al.
2022/0300903 A1 9/2022 Huang et al.
2022/0309573 A1 9/2022 Mathew et al.
2022/0318573 A1 10/2022 Smith et al.
2022/0318617 A1 10/2022 Wong et al.
2022/0327397 A1 10/2022 Braviner et al.
2022/0327430 A1 10/2022 Zuberi et al.
2022/0327431 A1 10/2022 Braviner et al.
2022/0327432 A1 10/2022 Gutierrez Bugarin et al.
2022/0327625 A1 10/2022 Leung et al.
2022/0335718 A1 10/2022 Ma et al.
2022/0343422 A1 10/2022 Zuberi et al.
2022/0366064 A1 11/2022 Nikoghossian et al.
2022/0383301 A1 12/2022 Jones et al.
2022/0383313 A1 12/2022 Jones et al.
2022/0383314 A1 12/2022 Jones et al.
2022/0405299 A1 12/2022 Leung et al.
2022/0414495 A1 12/2022 Stanevich et al.
2023/0006809 A1 1/2023 Shpurov et al.
2023/0007075 A1 1/2023 Mcphee et al.
2023/0011451 A1 1/2023 Lu
2023/0048437 A1 2/2023 Karbasi et al.
2023/0083899 A1 3/2023 Gandouet et al.
2023/0086653 A1 3/2023 Zykh et al.
2023/0107703 A1 4/2023 Zhang et al.
2023/0113752 A1 4/2023 Jorlett et al.
2023/0119108 A1 4/2023 Volkovs et al.
2023/0131935 A1 4/2023 Volkovs et al.
2023/0134065 A1 5/2023 Someya
2023/0153461 A1 5/2023 Kalra et al.
2023/0195734 A1 6/2023 Cashion et al.
2023/0196406 A1 6/2023 Gandouet et al.
2023/0244917 A1 8/2023 Loaiza Ganem et al.
2023/0244962 A1 8/2023 Volkovs et al.
2023/0252301 A1 8/2023 Volkovs et al.
2023/0259883 A1 8/2023 Misler et al.
2023/0267367 A1 8/2023 Volkovs et al.
2023/0267475 A1 8/2023 Navarro et al.
2023/0306434 A1 9/2023 Dunjic et al.
2023/0316485 A1 10/2023 Wakim et al.
2023/0318994 A1 10/2023 Moon et al.
2023/0336615 A1 10/2023 Joheb et al.
2023/0342481 A1 10/2023 Nikoghossian et al.
2023/0344814 A1 10/2023 Moon et al.
2023/0351116 A1 11/2023 Skaljin et al.
2023/0368048 A1 11/2023 Yang et al.
2023/0377047 A1 11/2023 Bouëttéet al.
2023/0385693 A1 11/2023 Cresswell et al.
2023/0385694 A1 11/2023 Cresswell et al.
2023/0386190 A1 11/2023 Cresswell et al.
2023/0394452 A1 12/2023 Jones et al.
2023/0401192 A1 12/2023 Yang et al.
2023/0401553 A1 12/2023 Navarro et al.
2023/0401572 A1 12/2023 Navarro et al.
2023/0419302 A1 12/2023 Navarro et al.
2023/0419402 A1 12/2023 Ghelichi et al.
2024/0020534 A1 1/2024 Perez Vallejo et al.
2024/0062117 A1 2/2024 Kuang et al.
2024/0106851 A1 3/2024 Kennedy et al.
2024/0119346 A1 4/2024 Chang et al.
2024/0126575 A1 4/2024 Kiriakou et al.
2024/0127036 A1 4/2024 Zuberi et al.
2024/0127214 A1 4/2024 Wander et al.
2024/0193562 A1 6/2024 Pratten et al.
2024/0202756 A1 6/2024 Karl et al.
2024/0203405 A1 6/2024 McDERMID et al.
2024/0211732 A1 6/2024 Wander et al.
2024/0212049 A1 6/2024 Ghelichi et al.
2024/0220653 A1 7/2024 D'Agostino
2024/0232614 A1 7/2024 Esmaeili et al.
2024/0232950 A1 7/2024 Navarro et al.
2024/0249310 A1 7/2024 Rai et al.
2024/0256903 A1 8/2024 Ens et al.
2024/0256904 A1 8/2024 Leung et al.
2024/0256968 A1 8/2024 Hosseinzadeh et al.
2024/0265055 A1 8/2024 Purkayastha
2024/0281467 A1 8/2024 Volkovs et al.
2024/0281808 A1 8/2024 Vouitsis et al.
2024/0281818 A1 8/2024 Golestan Irani et al.
2024/0289645 A1 8/2024 Makhijani et al.
2024/0289876 A1 8/2024 Mathew et al.
2024/0303551 A1 9/2024 Li et al.
2024/0304182 A1 9/2024 Hamilton et al.
2024/0330772 A1 10/2024 Cresswell et al.
2024/0330809 A1 10/2024 Carvalho et al.
2024/0338520 A1 10/2024 Misler et al.
2024/0346338 A1 10/2024 Desai et al.
2024/0370880 A1 11/2024 Jeske et al.
2024/0370881 A1 11/2024 Jeske et al.
2024/0385838 A1 11/2024 Yu et al.
2024/0386295 A1 11/2024 Yu et al.
2024/0386325 A1 11/2024 Yu et al.
2024/0386326 A1 11/2024 Yu et al.
2024/0386427 A1 11/2024 Abbas et al.
2024/0394569 A1 11/2024 Farhadi Hassan Kiadeh et al.
2024/0394588 A1 11/2024 Heglan et al.
2024/0403702 A1 12/2024 Deljavan Farshi
2024/0403862 A1 12/2024 Abbas et al.
2024/0412069 A1 12/2024 Volkovs et al.
2024/0412078 A1 12/2024 Ghelichi et al.
2024/0412083 A1 12/2024 Starszyk et al.
2024/0419978 A1 12/2024 Stein et al.

(56) References Cited

U.S. PATENT DOCUMENTS

| | | | |
|---|---|---|---|
| 2024/0420010 | A1 | 12/2024 | Cirulis et al. |
| 2024/0420011 | A1 | 12/2024 | Cirulis et al. |
| 2024/0428283 | A1 | 12/2024 | Belbahri et al. |
| 2025/0013363 | A1 | 1/2025 | Estoesta et al. |
| 2025/0013697 | A1 | 1/2025 | Estoesta et al. |
| 2025/0013927 | A1 | 1/2025 | Rho et al. |
| 2025/0014010 | A1 | 1/2025 | Jones et al. |
| 2025/0014052 | A1 | 1/2025 | Bhattacharjee et al. |
| 2025/0028852 | A1 | 1/2025 | Chowanski et al. |
| 2025/0028934 | A1 | 1/2025 | Wong et al. |
| 2025/0029012 | A1 | 1/2025 | Rho et al. |
| 2025/0045601 | A1 | 2/2025 | Zuberi et al. |
| 2025/0053387 | A1 | 2/2025 | Wang et al. |
| 2025/0068646 | A1 | 2/2025 | Rahman et al. |
| 2025/0068853 | A1 | 2/2025 | Lu |
| 2025/0069063 | A1 | 2/2025 | Navarro et al. |

OTHER PUBLICATIONS

Heglin et al., "Auto-Adjudication Process via Machine Learning," U.S. Appl. No. 19/053,942, filed Feb. 14, 2025.

* cited by examiner

100

200

Pool of User Accounts 210

User # ABC

User # A...

User #A12

User # XYZ

User # MNO

211

212

213

Filter Condition

User IDs

Host Process 220

Generate Message for Subset of Users

Advanced Broadcast Message 230

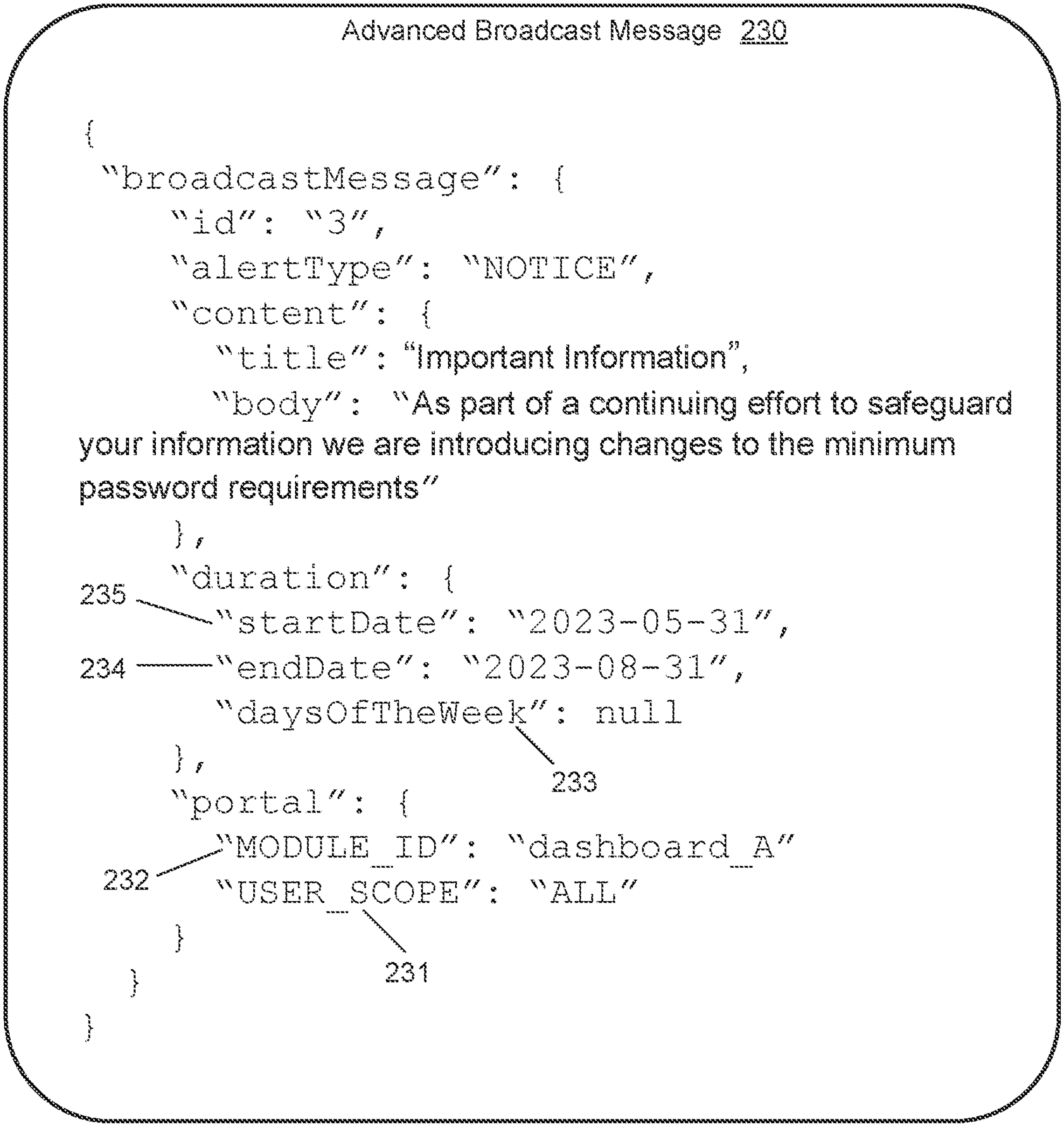

FIG. 2B

Advanced Broadcast Message  230

```
{
  "broadcastMessage": {
    "id": "3",
    "alertType": "NOTICE",
    "content": {
      "title": "Important Information",
      "body": "As part of a continuing effort to safeguard
your information we are introducing changes to the minimum
password requirements"
    },
    "duration": {
      "startDate": "2023-05-31",
      "endDate": "2023-08-31",
      "daysOfTheWeek": null
    },
    "portal": {
      "MODULE_ID": "dashboard_A",
      "USER_SCOPE": "ALL"
    }
  }
}
```

235
234
233
232
231

330

400

600

610

Storing User Accounts of a Software Application

620

Receiving a Request with Broadcast Parameters
via an API

630

Identifying a Subset of Users based on the
Broadcast Parameters

640

Generating an Electronic Message based on
the Request

650

Broadcast the Electronic Message to
Only the Subset of Users

700

710
Receiving a Request to Execute an
Activity of a Software Application

720
Storing the Request within a Queue

730
Executing a Workflow of Approval Events
for the Requested Activity

740
Determining the Request is Approved based on
Execution of the Workflow

750
Executing the Activity via the Software Application and
Removing the Request from the Queue <u>800</u>

810

Logging In a User with a Software Application

820

Displaying a Dashboard with a Plurality of Movable Display Modules

830

Receiving a Command via the User Interface to Reconfigure a Position of a Movable Display Module

840

Modifying the Position of the Movable Display Module within the Dashboard

RECONFIGURABLE DASHBOARD WITH MOVEABLE MODULES

BACKGROUND

Interacting with various institutions can be cumbersome and redundant at times. In some cases, the workflow may include tasks that are performed by the customer/user. Keeping track of the dependencies and the ordering of such tasks, especially when different user interfaces and user types are needed, can be difficult. As a result, such workflows are typically managed on a manual basis or in a generically automated way that does not improve performance.

Meanwhile, the user interfaces of the software programs, applications, etc., that customers and employees interact with are usually based on a generic layout that a web designer sets. These designs are not always designed for efficiency. Users may desire to move content within the web page but may be restricted from doing so by the software itself. Accordingly, what is needed is improved central management for business-based services.

SUMMARY

One example embodiment provides an apparatus that may include a storage device to store a plurality of user accounts of a plurality of users of a software application, and a processor configured to one or more of receive input data via an application programming interface (API) of a software application, wherein the input data comprises broadcast parameters, identify a subset of users from among the plurality of users of the software application based on the broadcast parameters, generate an electronic message based on a message template and the input data received via the API, and broadcast the electronic message to only a subset of the user accounts within the software application corresponding to the identified subset of users.

Another example embodiment provides a method that includes one or more of storing a plurality of user accounts of a plurality of users of software application in a storage device, receiving input data via an application programming interface (API) of a software application, wherein the input data comprises broadcast parameters, identifying a subset of users from among the plurality of users of the software application based on the broadcast parameters, generating an electronic message based on a message template and the input data received via the API, and broadcasting the electronic message to only a subset of the user accounts within the software application corresponding to the identified subset of users.

Another example embodiment provides a computer-readable medium comprising instructions that when read by a processor, cause the processor to perform one or more of storing a plurality of user accounts of a plurality of users of software application in a storage device, receiving input data via an application programming interface (API) of a software application, wherein the input data comprises broadcast parameters, identifying a subset of users from among the plurality of users of the software application based on the broadcast parameters, generating an electronic message based on a message template and the input data received via the API, and broadcasting the electronic message to only a subset of the user accounts within the software application corresponding to the identified subset of users.

Another example embodiment provides an apparatus that may include a storage device that includes a queue, and a processor to one or more of receive a request to execute an activity of a software application, store the request within the queue, execute a workflow of approval events via one or more user accounts that are logged into one or more instances of the software application, respectively, determine that the request to execute the activity is approved based on the execution of the workflow of approval events, and in response to the determination, execute the activity within the software application and remove the request from the queue.

Another example embodiment provides a method that may include one or more of receiving a request to execute an activity of a software application, storing the request within the queue, executing a workflow of approval events via one or more user accounts that are logged into one or more instances of the software application, respectively, determining that the request to execute the activity is approved based on the execution of the workflow of approval events, and in response to the determination, executing the activity within the software application and removing the request from the queue.

Another example embodiment provides a computer-readable medium comprising instructions that, when read by a processor, cause the processor to perform one or more of receiving a request to execute an activity of a software application, storing the request within the queue, executing a workflow of approval events via one or more user accounts that are logged into one or more instances of the software application, respectively, determining that the request to execute the activity is approved based on the execution of the workflow of approval events, and in response to the determination, executing the activity within the software application and removing the request from the queue.

Another example embodiment provides an apparatus that may include a processor to one or more of login a user device with a software application, display a dashboard of the software application on the user device, where the dashboard includes a plurality of movable display modules with different display content enclosed therein, respectively, receive a command via the dashboard to reconfigure a position of a movable display module within the dashboard from among the plurality of movable display modules and modify the position of the movable display module to a different position within the dashboard based on position information included in the received command to generate a reconfigured dashboard.

Another example embodiment provides a method that may include one or more of logging in a user device with a software application, displaying a dashboard of the software application on the user device, where the dashboard includes a plurality of movable display modules with different display content enclosed therein, respectively, receiving a command via the dashboard to reconfigure a position of a movable display module within the dashboard from among the plurality of movable display modules, and modifying the position of the movable display module to a different position within the dashboard based on position information included in the received command to generate a reconfigured dashboard.

And yet a further example embodiment provides a computer-readable medium comprising instructions that, when read by a processor, cause the processor to perform one or more of logging in a user device with a software application, displaying a dashboard of the software application on the user device, where the dashboard includes a plurality of movable display modules with different display content enclosed therein, respectively, receiving a command via the dashboard to reconfigure a position of a movable display module within the dashboard from among the plurality of movable display modules, and modifying the position of the movable display module to a different position within the dashboard based on position information included in the received command to generate a reconfigured dashboard.

BRIEF DESCRIPTION OF THE DRAWINGS

FIGS. 2A-2B are diagrams illustrating a process of a message broadcasting process according to example embodiments.

DETAILED DESCRIPTION

Figure 1:
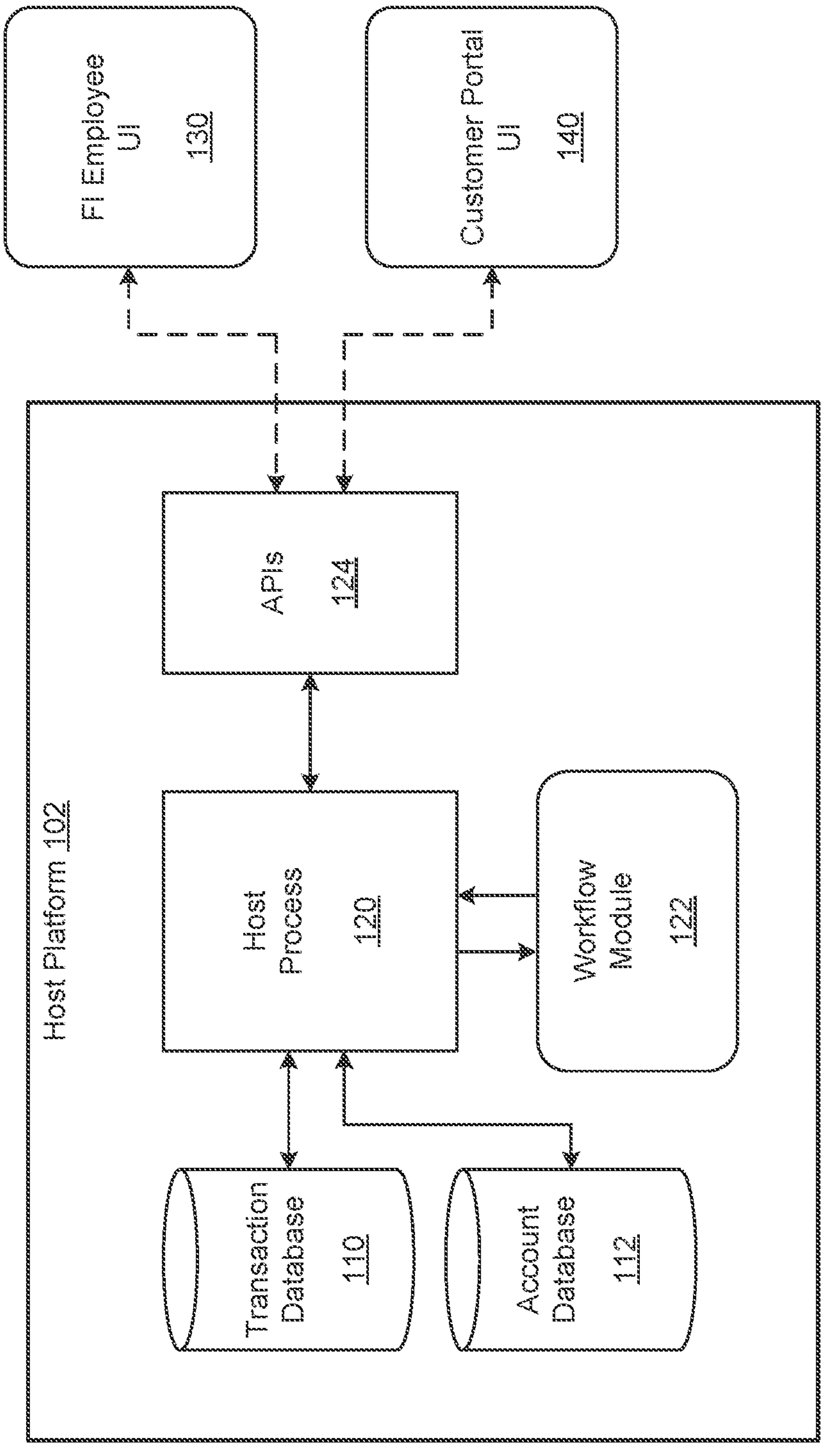
FIG. 1 is a diagram illustrating a host platform that can perform the processes described herein according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language throughout this specification refers to the fact that a particular feature, structure, or characteristic described in connection with the embodiment may be included in at least one embodiment. Thus, appearances of the phrases "example embodiments," "in some embodiments," "in other embodiments," or other similar language throughout this specification do not necessarily all refer to the same group of embodiments. The described features, structures, or characteristics may be combined or removed in any suitable manner in one or more embodiments. Further, in the diagrams, any connection between elements can permit one-way and/or two-way communication, even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, directed to a host platform (such as a cloud platform, web server, on-premises server, database, etc.) of a software application that can improve the efficiency of the users that interact with the software application and improve the security of the processes that are executed by the host platform. For example, the host platform described herein may provide advanced broadcast messaging capabilities. As another example, the host platform described herein may provide a new workflow module for securely processing various approval flows between different user interfaces, etc. As another example, the host platform described herein may provide a configurable dashboard with web-based features that can be moved within the site/page.

The advanced broadcast messaging process may be performed by a user such as a customer, bank employee, etc., interacting with a software application to broadcast electronic messages (e.g., emails, text messages, SMS messages, MMS messages, etc.) in a targeted fashion that only sends the messages to a subset of users or a group of users within a larger set of users of the software application. The messages may include generic structures, and they may be targeted to a particular type of user, group of users, organization, etc., using an identifier of such a user type, etc. The advanced broadcast messaging may also have a duration during which the messages will be pushed to the desired destinations enabling more fine-tuned controls.

The workflow process may be performed by the host platform when a user, software program, system, etc., needs approval to take an action such as to modify a credit limit, change user entitlements, make payments, etc.) The workflow process may be managed by a workflow module within the host platform, which controls the process and ensures that only the necessary users are able to interact with the process at the correct times and in the correct order. The workflow process provides an additional layer of security for the workflows that interact with sensitive user data.

The configurable dashboard may be used by a customer or an employee. The configurable dashboard may include a number of modules/cards that include different display content therein. The content may be dynamic, interactive, text, video, images, audio, etc. Users of the dashboard can use an input mechanism, such as a mouse, finger, keyboard, etc., to move the modules around within the application page/site to make it easier for the user to use the software application through the dashboard. Thus, each user can configure the dashboard based on their own preferences.

FIG. 1 illustrates a computing environment 100 which includes a host platform 102 that hosts a host process 120 that can perform the processes described herein according to example embodiments. Referring to FIG. 1, the host platform 102 may be a cloud platform, a web server, a database, an on-premises server, a combination of systems, and the like. Here, the host platform 102 may host a software application (host process 120) such as a mobile application, web application, progressive web application (PWA), etc., which can be interacted with over a network or locally installed by user devices (not shown). As an example, a user device may install a front-end of the software application and interact with a back-end of the software application hosted by the host process 120 on the host platform 102.

According to various embodiments, the host process 120 may include one or more application programming interfaces (APIs) 124, which may control any of the processes that are performed by the host process 120 via one or more user interfaces (dashboards) such as employee user interface 130 and customer portal user interface 140, etc. For example, the one or more APIs 124 may include APIs that enable access to a workflow module 122 for performing the workflow processes described herein, including modifying a credit limit, authorization loan, authorization of a payment, etc. Any of the workflows can rely on data stored in a transaction database 110, which includes a historical database of user transactions, and an account database 112, which includes a current status of payment accounts held by a financial institution such as a bank or other entity. The one or more APIs 124 may also control access to the advanced broadcast messaging capabilities performed by the host process 120. As another example, the one or more APIs 124 may also enable the reconfiguration of display modules within a front-end user interface of the software application (via the employee user interface 130 and the customer portal user interface 140).

The one or more APIs 124 may be associated with an API software development kit (SDK) that supports the logic for the one or more APIs 124. The SDK may include the logic for accessing workflow module 122. The SDK may also include validation logic to be used by the workflow module 122. The one or more APIs 124 may also use wrappers to deploy functionality within different host environments. The wrappers may be built over the SDK and may be lightweight. In some embodiments, different wrappers may be used for different languages, countries, etc., enabling the same logic to be used but with different wrapper implementations.

Figure 2A:
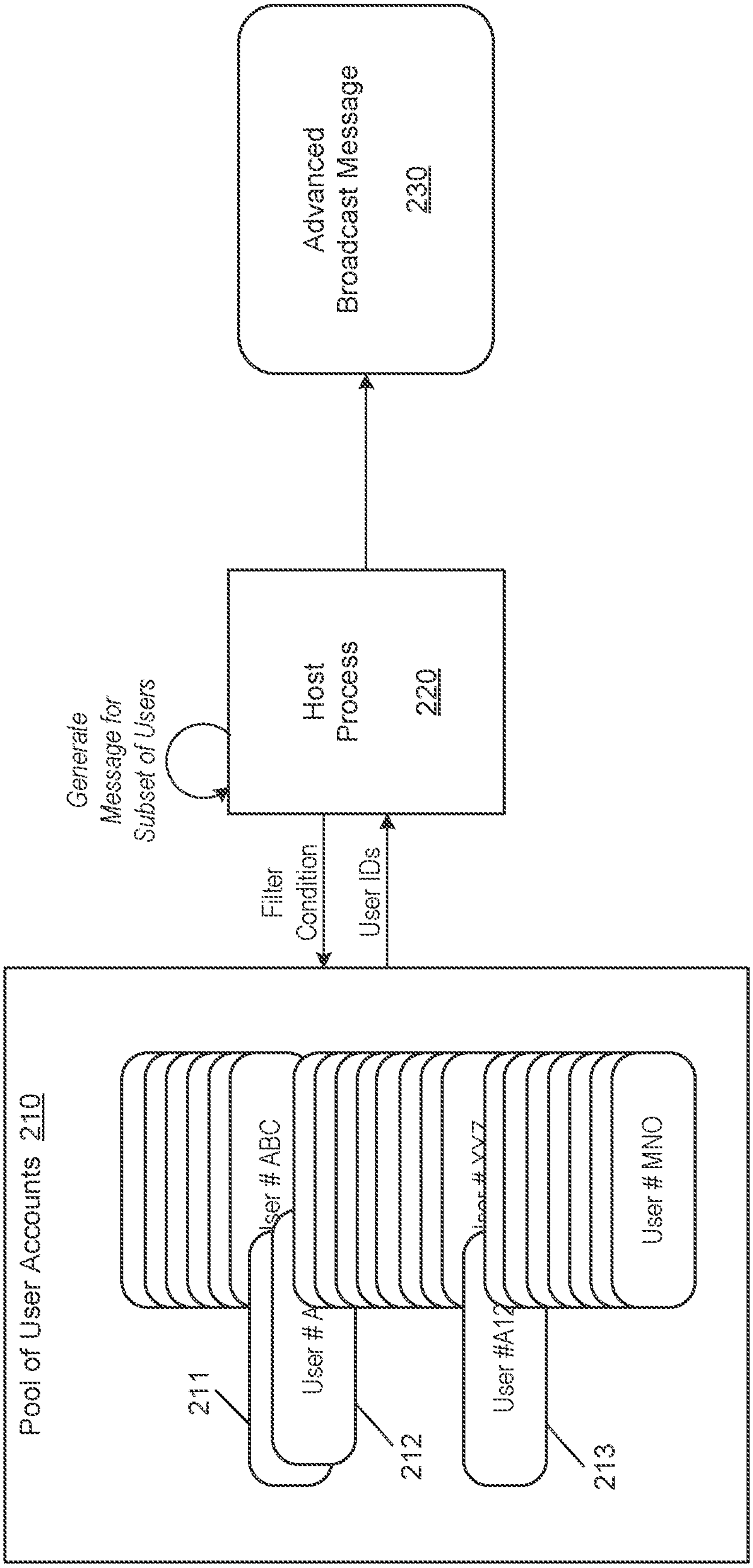

FIGS. 2A-2B illustrates a message broadcasting process that can be targeted to a subset of users of a software application according to example embodiments. For example, FIG. 2A illustrates a process 200 of a host process 220 generating and sending an advanced broadcast message 230 to a subset of user accounts 211, 212, and 213 from among a larger pool of user accounts 210. The advanced broadcast message 230 may be an electronic message that is selectively targeted/broadcast to a smaller subset of users among the user accounts of the software. The electronic message may be an email, an instant message, a chat message, etc. Here, the pool of user accounts 210 may correspond to all available users of a software application, etc. To access a user account, the host process 220 may require a user of the user account to log in to the software application hosted by the host process 220. Each user account may have its own respective login credentials. Accessing the software application may be controlled by the host process 220 such that users that do not provide the proper login credentials are not granted access to the software application. For users who successfully log into their user accounts, the users are given access to a particular data set available at the host platform, such as data associated with a particular financial account or set of accounts of that user and/or that user's family. The users are also given the ability to generate and send advanced broadcast messages such as advanced broadcast message 230.

For example, the host process 220 may receive a filter condition that can be used to filter the user accounts in the pool of user accounts 210 to identify a particular subset of user accounts from among the pool of user accounts 210 that satisfy the filter condition. For example, the filter condition may include the name of an organization, a type of payment account (e.g., investment account, checking account, savings account, credit card, etc.), a type of payment, a type of user role with a company, a type of employee, a type of customer, etc. The messages may be sent to both customers of the financial institution and employees. The filter condition may be included within a larger set of broadcast attributes that can be provided by the user via a user interface (not shown) when the user is logged into their account. Here, the user may select to send a message (such as from an inbox in their account) to inboxes of other user accounts of the software application. The message may be an electronic message such as an email, a text message, or the like.

The filter condition may be received via a user interface of the software application and may be input by the user of the user account that wants to send the message. As another example, the message may be auto-generated by a software program such as the host process 220 or another program that requests the host process 220 for the subset of users.

In some embodiments, the subset of user accounts 211, 212, and 213 may correspond to users that need to perform a multi-party workflow; however, embodiments are not limited thereto. That is, in some cases, the advanced broadcast messaging described in the examples of FIGS. 2A and 2B may be used in conjunction with the workflow processes described herein, including the examples described in FIGS. 3A-3C, and the configurable dashboard described herein, including the examples described in FIGS. 4 and 5A-5C.

The host process 220 may be part of a messaging framework that can be driven by configuration and that can push messages to specific user accounts/inboxes in the user experience using different control attributes referred to herein as broadcast attributes. The broadcast attributes enable a selective broadcast of a message to a subset of user accounts within the software application. The broadcast attributes can be integrated into the electronic message. For example, as shown in FIG. 2B, the broadcast attributes within the advanced broadcast message 230 may include an attribute 231 that identifies a particular user type/target of the message such as system administrators, users in a specific class/category, users with a specific role in a company, users that are part of a same organization, etc.

The broadcast attributes may also include an attribute 232, which identifies a particular display module on the user interface where the message is to be displayed. For example, the attribute value 232 may identify a module from among a plurality of display modules that can be moved around in a configurable dashboard. The broadcast attributes may also include attributes 233, 234, and 235 that provide timing parameters to enable the advanced broadcast message 230 to be delivered to the subsets of users at different times based on the individual preferences of the users and/or different geographic locations, time zones, etc., of the users. For example, the attributes 231, 232, 233, 234, and 235 may be set by the host process 220.

Having such capabilities enables the host process 220 to support future business needs and to be able to push messages to customers at any time without the need for code changes. In some embodiments, the messaging system/framework described herein may be an email application, messaging application, or the like. The system may enable custom/specific rules to be applied to individual user accounts to able to create messages to target customers or functionality with the need to involve any other parties. For example, the ability of a user account to send a particular type of message may need to be approved by the host process 220 before it can be sent. Here, the host process 220 may determine the message capabilities of the particular user account attempting to send the message and compare it to the content within the message, such as a type of users to target with the message and determine if the user account is authorized to send a message to such a target(s) based on the rules.

Figure 3A:
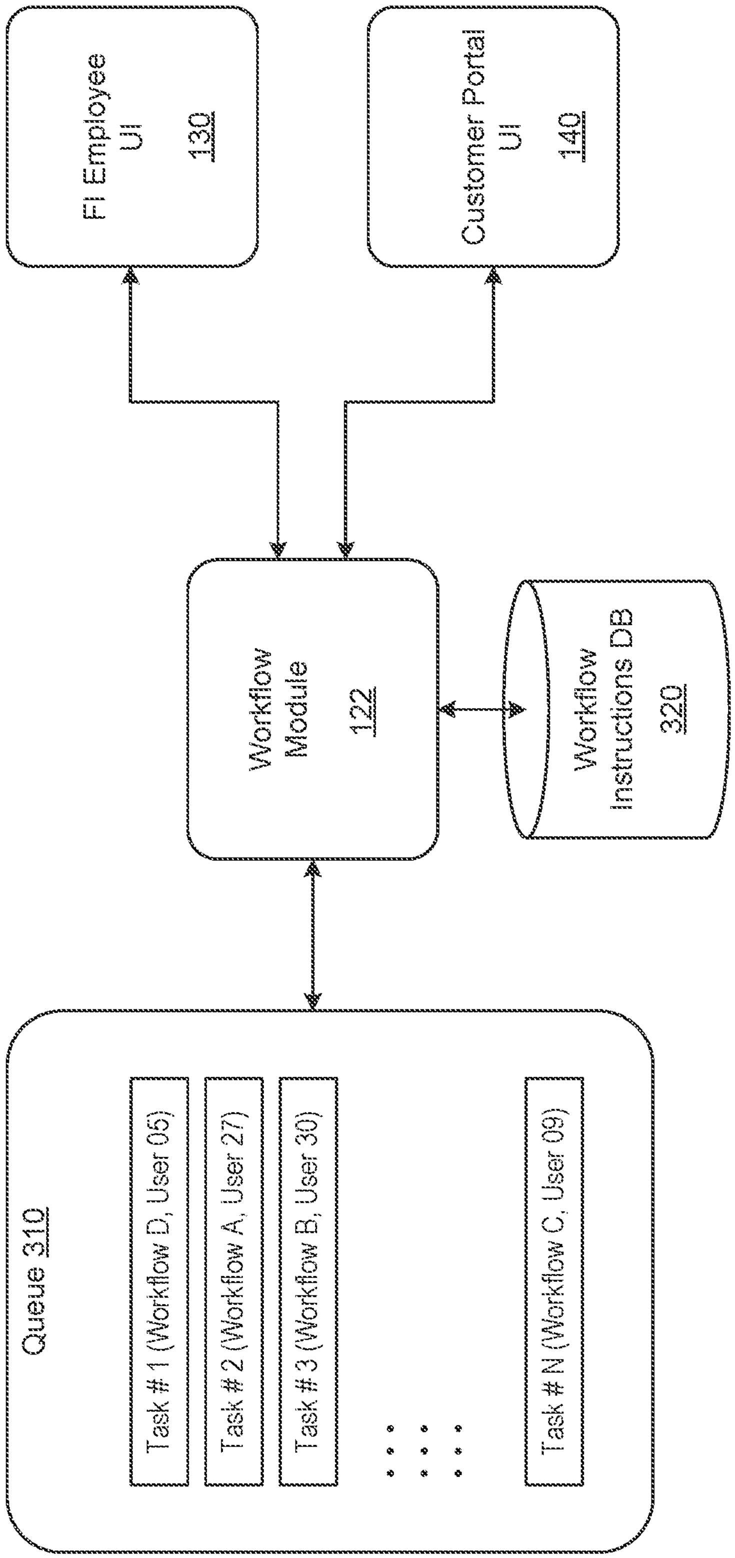
FIGS. 3A-3B are diagrams illustrating a process of managing a workflow for a financial institution according to example embodiments.
Figure 3B:
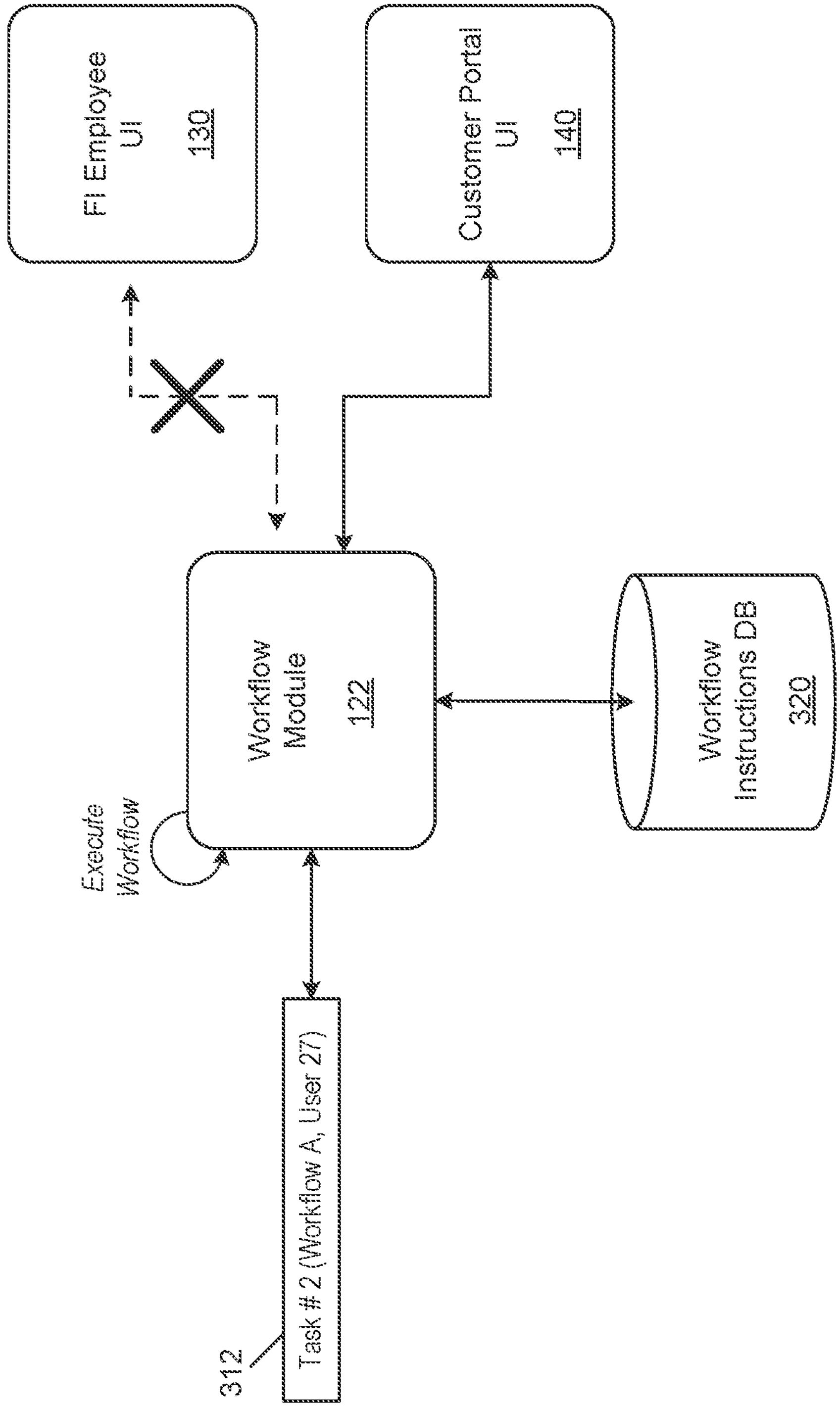

FIGS. 3A-3B illustrates a process of managing a workflow for a financial institution according to example embodiments. For example, FIG. 3A illustrates a process 300 performed by the workflow module 122 shown in FIG. 1. In this example, the workflow module 122 is coupled to a workflow instructions database 320, which includes program instructions for executing various workflows within a software application (such as the host process 120). Workflows may be triggered by a request from a user account or in person.

As another example, a workflow may be triggered by a software program, such as a software program attempting to change the credit limit of a credit card with a server of a financial institution. For example, the software program may submit an API call to the workflow module 122, via the one or more APIs 124, with an identifier of a workflow. In response, the workflow module 122 may execute the workflow and store an identifier of the workflow within a queue 310. The queue 310 may be used to store entries of the workflows that are currently processing, along with state information about the workflows, such as percentage completed, next step to complete, what it's waiting for, etc. Each entry may identify a particular workflow and a user associated with the workflow.

According to various embodiments, when a workflow is triggered, for example, via an API call through the one or more APIs 124 shown in FIG. 1, the workflow module 122 identifies a set of instructions associated with the workflow from the workflow instruction database 320 and executes the set of instructions. The workflow module 122 may also generate an entry representing the newly executed workflow and store it within the queue 310 along with an identifier of a user associated with the workflow and any other details such as an identifier of a payment account, etc.

The workflow process may require input from one or more screens, such as user interfaces 130 and 140 of a software application. In this example, the user interface 130 is used by internal employees of a financial institution, while the user interface 140 is used by external customers of the financial institution. The workflows carried out may require inputs from both employee user interfaces and customer user interfaces at different times. The workflow instructions stored within the workflow instruction database 320 identify which instructions to execute, the order/sequence, and the amount of time. The workflow instructions may also include the actual code that is executed by the workflow module 122.

For example, FIG. 3B illustrates a process 330 of the workflow module 122 executing a workflow corresponding to an entry 312 in the queue. In this example, the instructions executed by the workflow module 122 cause workflow module 122 to prevent input from all other user interfaces associated with the workflow except the user interface 140, which may correspond to a particular user account within the software application. Here, the workflow module 122 can ensure that a particular user account provides specific input to keep the workflow process moving forward. Absent such a specific input, the workflow module 122 may hold the process indefinitely within the queue 310 until a condition is reached, such as a default timeout condition, etc.

In some embodiments, the workflow module 122 can be used for Approval capabilities within the platform. For example, the workflows may include user inputs being received via one or more user interfaces (user accounts) and may require specific inputs (e.g., box checks, signatures, values entered, etc.). The workflow module 122 can ensure that such steps are carried out on the screens that are allowed. The workflow module 122 can support different operations within the platform on both the employee side and the customer side, including submitting payment transactions, changing user entitlements, modifying credit limits on credit accounts, etc. The workflow module 122 provides an extra level of security where one or more parties need to approve different types of activities (Payments, User Entitlements, Limit changes, etc.) before it gets executed.

Figure 4:
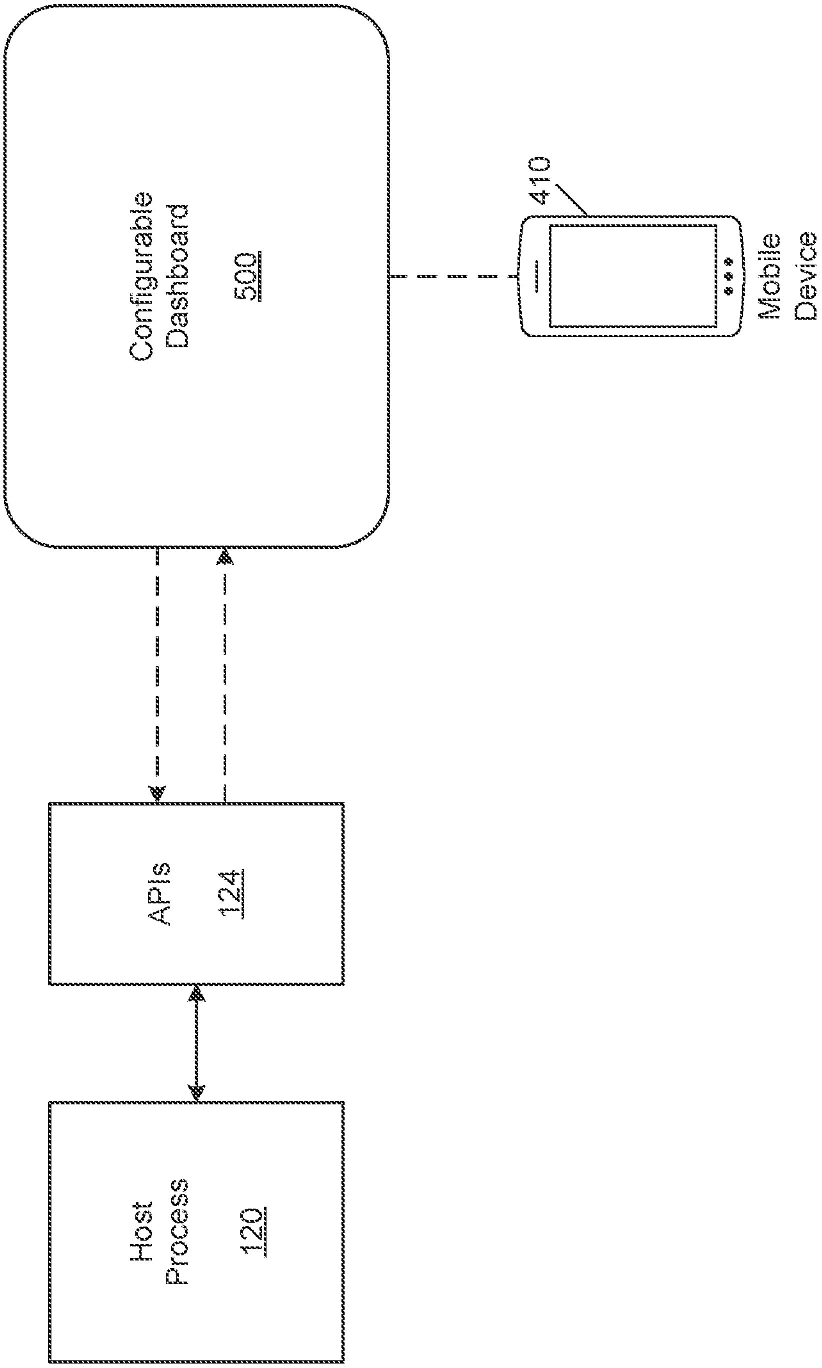
FIG. 4 is a diagram illustrating a system that includes a configurable dashboard according to example embodiments.

FIG. 4 illustrates a system 400 that includes a configurable dashboard 500 according to example embodiments. Referring to FIG. 4, the host process 120 shown in FIG. 1 can output a configurable dashboard 500 as part of a user experience for a mobile application such as a banking application installed on a mobile device 410. In this example, the configurable dashboard 500 may be enabled via the one or more APIs 124. For example, a user may move widgets around within the configurable dashboard 500. The movement of the positions of the widget may be enabled via the one or more APIs 124.

Figure 5A:
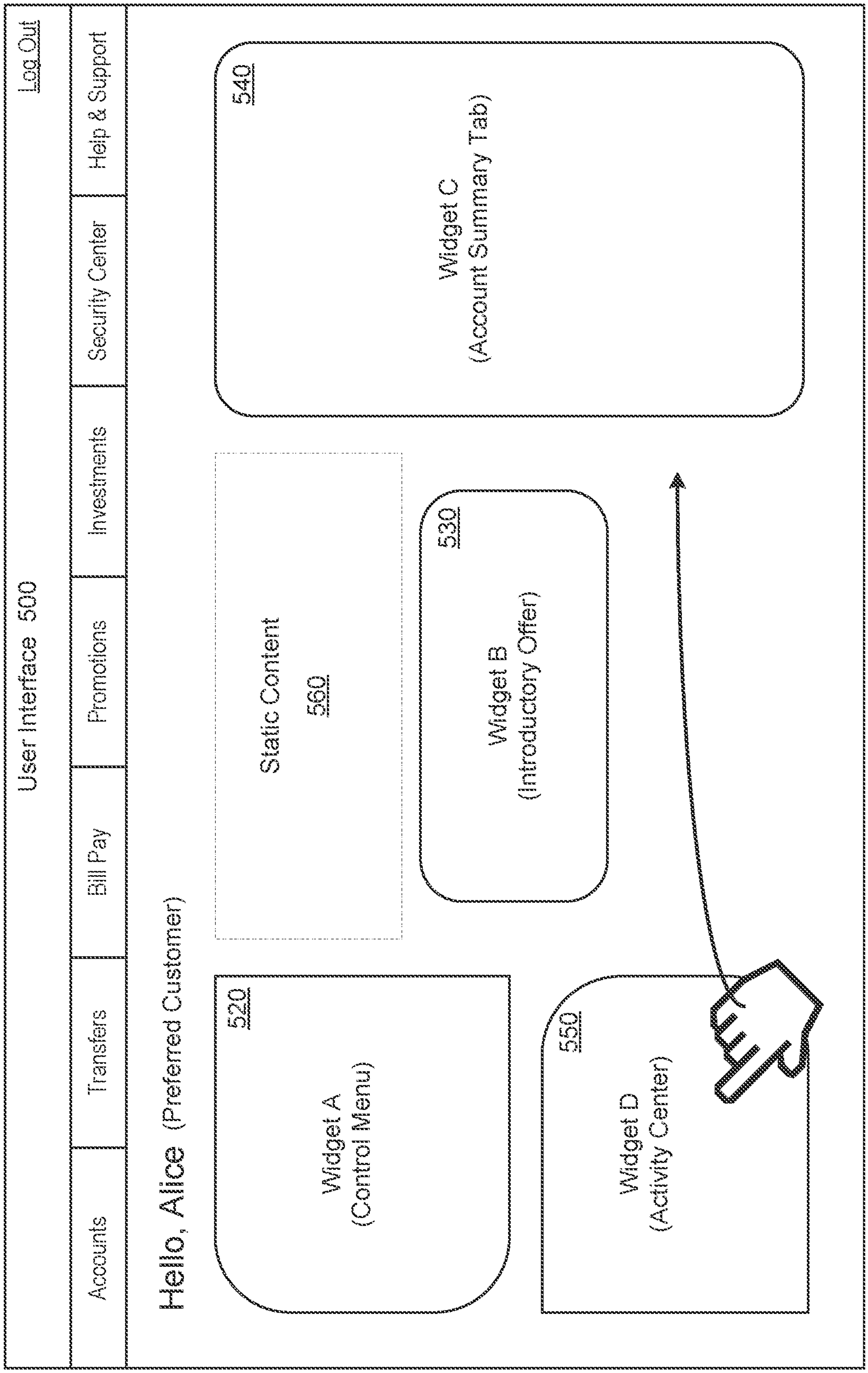
FIGS. 5A-5C are diagrams illustrating a process of reconfiguring the configurable dashboard of FIG. 4, according to example embodiments.
Figure 5B:
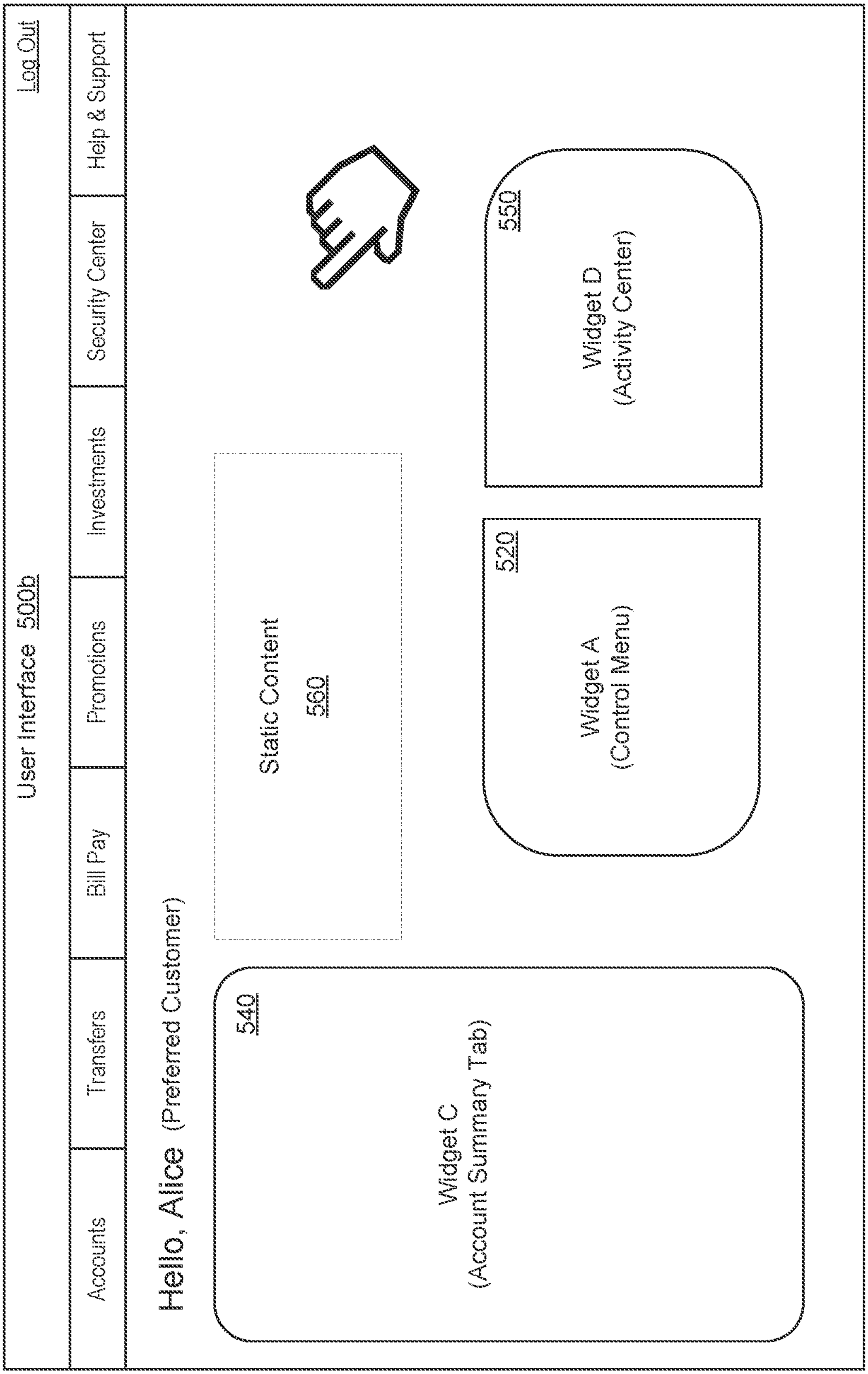
Figure 5C:
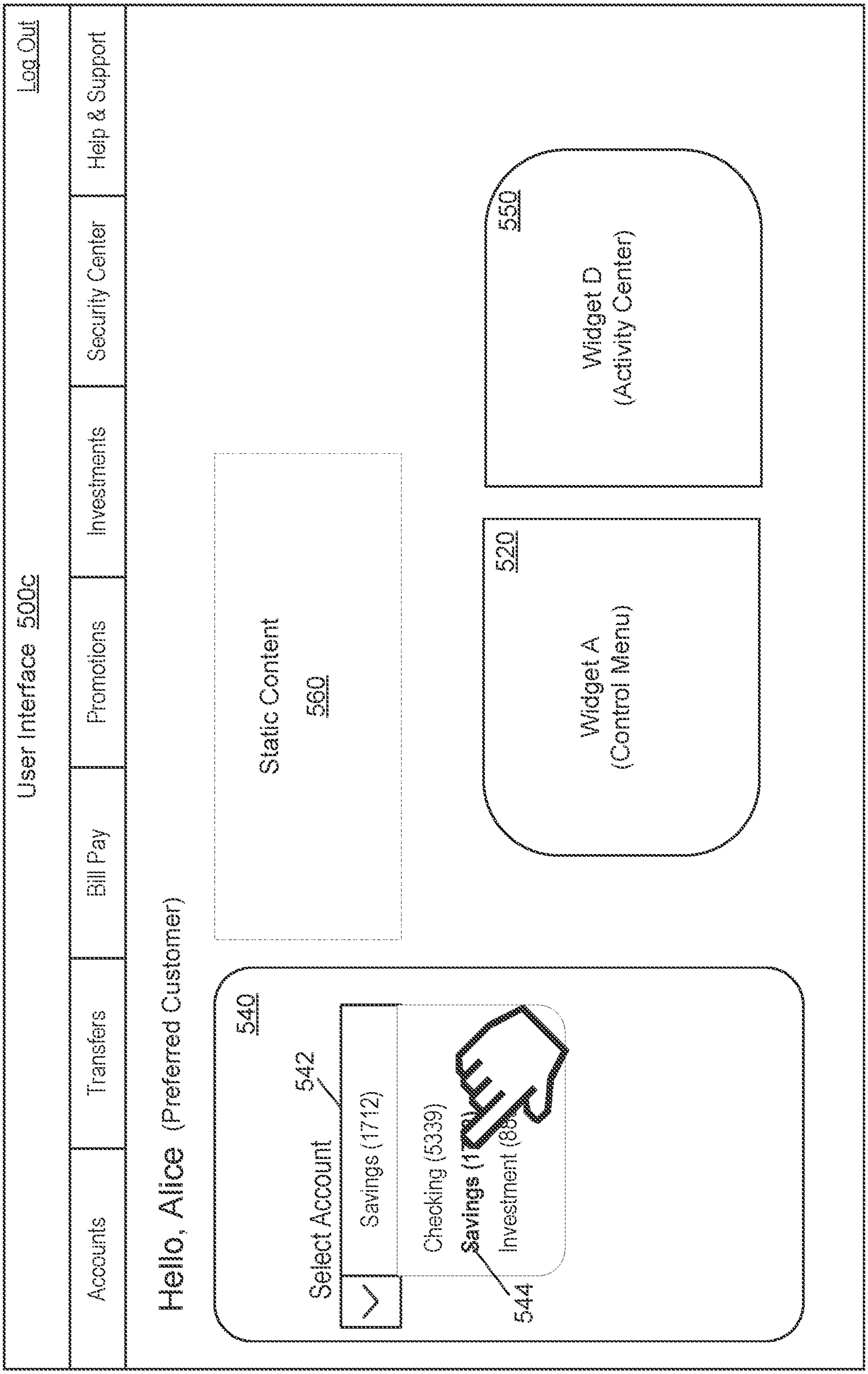

FIGS. 5A-5C illustrates a process of reconfiguring the configurable dashboard 500 shown in FIG. 4, according to example embodiments. Referring to FIGS. 5A-5C, the configurable dashboard 500 is composed of a plurality of widget cards 520, 530, 540, and 550, each providing a summarized view of various aspects of the application. The configurable dashboard 500 also includes an area of static content 560.

The active user's permissions control whether a widget is displayed or not. These permissions are applied to a previously saved dashboard configuration or a default layout when saved data isn't available. Widgets can be collapsed or expanded to help manage screen real estate as well as the user's attention. Using a mouse or other pointer mechanism such as a finger, stylus, etc., widgets can be dragged up, down, left, and right depending on their original location and other predetermined layout boundaries. Alternatively, a widget's position can be controlled via a keyboard-accessible menu. With each change to the configuration of the dashboard layout (widget position), the configuration is stored locally in the browser on the mobile device 410. As another example, the dashboard state (including any reconfigurations) can be persisted to a database via an API of the database. To minimize database calls, the dashboard state may only be persisted to the database upon navigation changes away from the dashboard, thereby minimizing the number of network API calls. The configurable dashboard 500 may display content that complies with WCAG 2.1 accessibility standards. The one or more APIs 124 may accommodate additions or modifications to widget status attributes without disrupting the overall functionality. This flexible design ensures the system's adaptability and facilitates ongoing improvements and updates.

For example, as shown in FIG. 5A to FIG. 5B, the user can move the widgets around, such as moving widgets 520, 540, and 550, to create a reconfigured dashboard 500*b* as shown in FIG. 5B. The user can also disable or hide widgets such as widget 530 via the user interface controls. Upon making these changes, the locations (pixel positions) of the widgets on the screen may be persisted locally within a browser where the configurable dashboard 500 is displayed. As another example, the locations of the widgets can be persisted in a database (not shown), such as when the user leaves the dashboard.

FIG. 5C illustrates an additionally reconfigured dashboard 500*c*. In this example, the user has opened a menu 542 within the widget 540 to change an account summary that is currently being viewed within the widget 540 (display area/module), into a different account 544 via the menu 542. In doing so, the user can dynamically change what data is shown/visible within each widget card on the configurable dashboard, if desired.

Figure 6:
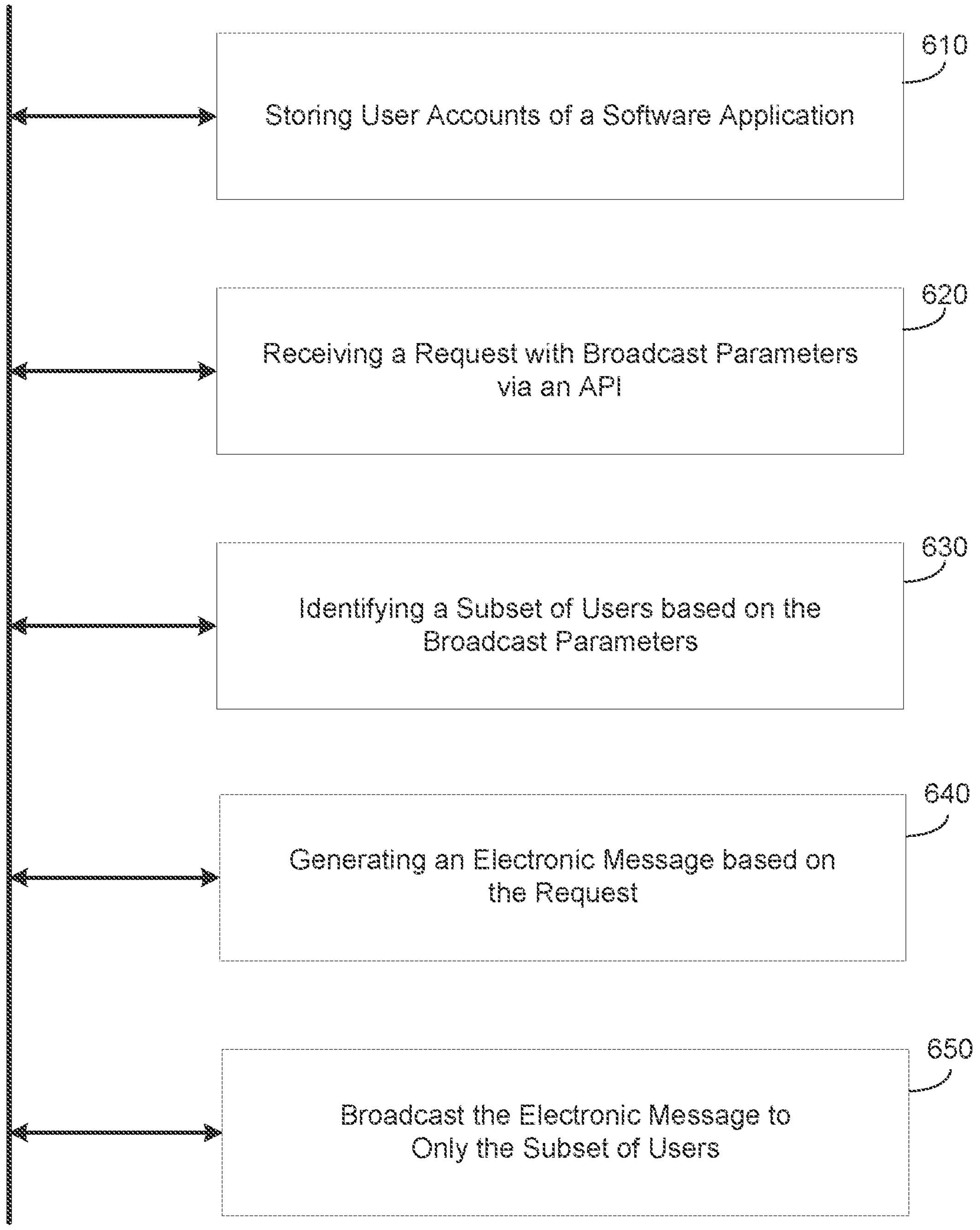
FIG. 6 is a diagram illustrating a method of generating and sending an advanced broadcast message according to example embodiments.

FIG. 6 illustrates a method 600 of generating and sending an advanced broadcast message according to example embodiments. For example, the method 600 may be performed by a host platform such as a cloud platform, a web server, a database, and the like. Referring to FIG. 6, in 610, the method may include storing a plurality of user accounts of a plurality of users of software applications in a storage device. In 620, the method may include receiving input data via an application programming interface (API) of a software application, wherein the input data comprises broadcast parameters. In 630, the method may include identifying a subset of users from among the plurality of users of the software application based on the broadcast parameters. In 640, the method may include generating an electronic message based on a message template and the input data received via the API. In 650, the method may include broadcasting the electronic message to only a subset of the user accounts within the software application corresponding to the identified subset of users.

In some embodiments, the identifying may include identifying the subset of users based on an identifier of an organization included in the broadcast parameters. In some embodiments, the broadcasting may include broadcasting the message to the subset of user accounts at different times based on time parameters included in the broadcast parameters. In some embodiments, the input data may further include message content to be included in the message, and the method may further include verifying whether the message content is allowed based on one or more rules. In some embodiments, the method may further include identifying a user that is currently logged into the software application, identifying one or more rules that are assigned to the user, and verifying whether the message content is allowed based on the one or more identified rules that are assigned to the user.

In some embodiments, the identification may include identifying the subset of users based on a system administrator identifier included in the broadcast parameters. In some embodiments, the method may further include simultaneously pushing the electronic message to the subset of user accounts at a same time based on time parameters included in the broadcast parameters. In some embodiments, the method may further include storing the broadcast parameters within the electronic message prior to broadcasting the electronic message.

Figure 7:
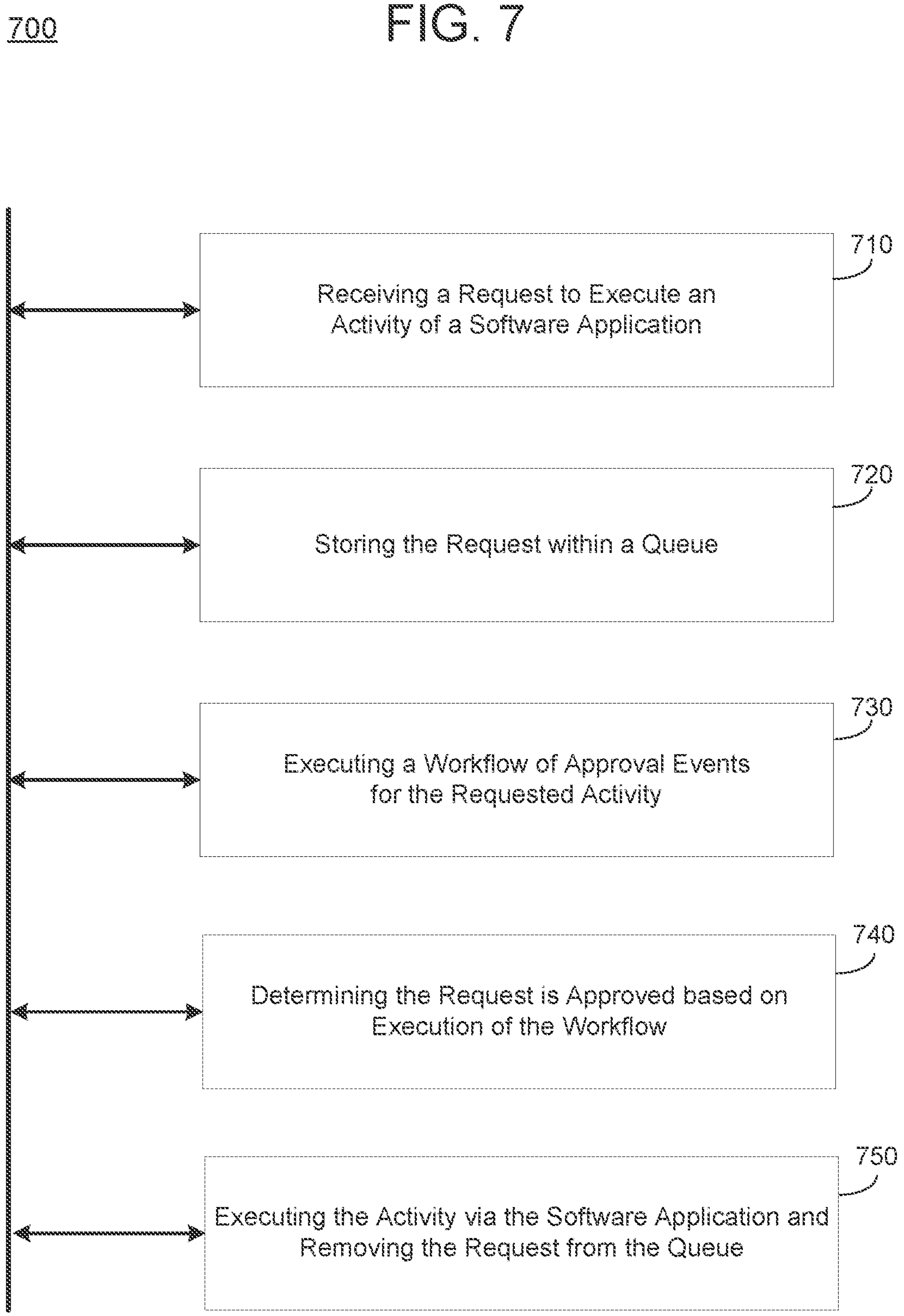
FIG. 7 is a diagram illustrating a method of dynamically executing a workflow via a workflow engine according to example embodiments.

FIG. 7 illustrates a method 700 of dynamically executing a workflow via a workflow engine according to example embodiments. For example, the method 700 may be performed by a host platform such as a cloud platform, a web server, a database, and the like. Referring to FIG. 7, in 710, the method may include receiving a request to execute an activity of a software application. In 720, the method may include storing the request within a queue. In 730, the method may include executing a workflow of approval events via one or more user accounts that are logged into one or more instances of the software application, respectively. In 740, the method may include determining that the request to execute the activity is approved based on the execution of the workflow of approval events. In 750, the method may include, in response to the determination, executing the activity within the software application and removing the request from the queue.

In some embodiments, executing the workflow may include executing the workflow of approval events via at least one customer account of the software application and at least one employee account of the software application. In some embodiments, executing the workflow may include generating a message associated with the activity and displaying the message via one or more user accounts, along with an approval button for approving the activity. In some embodiments, executing the workflow may further include detecting a selection of the approval button via a user account from among the one or more user accounts and, in response, determining that the request to execute the activity is approved.

In some embodiments, executing the activity may include executing one or more changes to a payment account stored within the software application based on the execution of the activity within the software application. In some embodiments, the storing may include storing an entry within the queue, which comprises an identifier of a user associated with the request and an identifier of the activity. In some embodiments, the method may further include executing a time-to-live job for the entry within the queue based on a timing parameter associated with the workflow. In some embodiments, the method may further include executing a payment transaction via the software application based on the execution of the activity within the software application.

Figure 8:
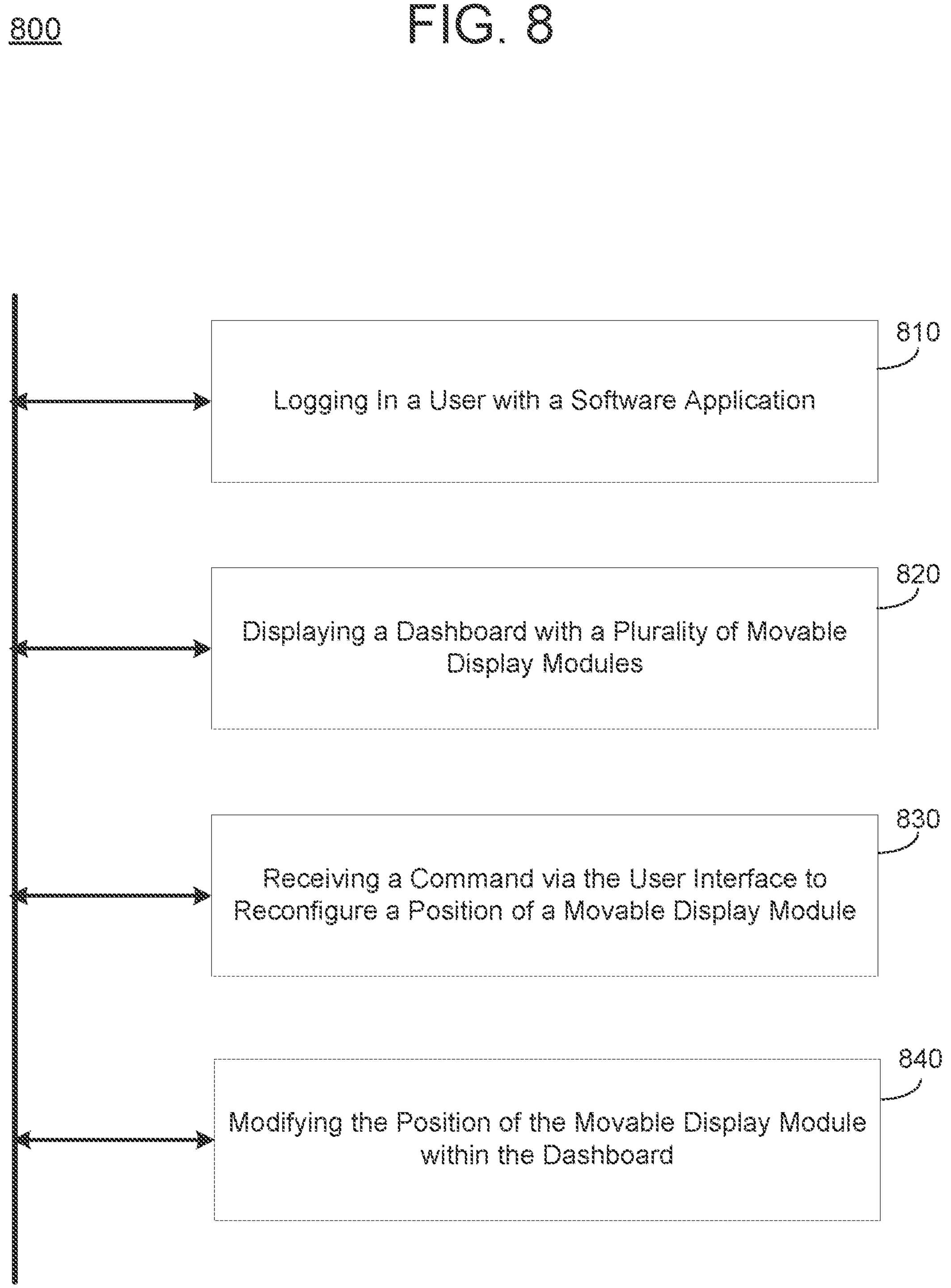
FIG. 8 is a diagram illustrating a method of reconfiguring display modules of content within a dashboard according to example embodiments.

FIG. 8 illustrates a method 800 of reconfiguring display modules of content within a dashboard according to example embodiments. For example, the method 800 may be performed by a host platform such as a cloud platform, a web server, a database, and the like. Referring to FIG. 8, in 810, the method may include logging in a user device with a software application. In 820, the method may include displaying a dashboard of the software application on the user device, wherein the dashboard comprises a plurality of movable display modules with different display content enclosed therein, respectively. In 830, the method may include receiving a command via the dashboard to reconfigure a position of a movable display module within the dashboard from among the plurality of movable display modules. In 840, the method may include modifying the position of the movable display module to a different position within the dashboard based on position information included in the received command to generate a reconfigured dashboard.

In some embodiments, the displaying may further include displaying one or more static portions of content in between the plurality of movable display modules, wherein the one or more static portions of content cannot be moved. In some embodiments, the displaying may include displaying web content within the dashboard, which complies with accessibility standards set forth by Web Content Accessibility Guidelines (WCAG) 2.1. In some embodiments, the method may further include dynamically removing one or more of display modules from the dashboard prior to displaying the dashboard based on user preferences assigned to the user device. In some embodiments, the method may further include persisting coordinate positions of the different positions of the movable display module to a web browser in response to modifying the position of the movable display module.

In some embodiments, the method may further include persisting the coordinate positions of the different positions of the movable display module to a back-end server in response to a navigation command on the dashboard. In some embodiments, the receiving may include receiving the command via an application programming interface (API) associated with the dashboard, wherein the API enables the movable display modules to change positions on the dashboard. In some embodiments, the method may further include detecting an additional input to a second movable display module that comprises a display of content associated with an account summary and dynamically changing the content associated with the account summary within the second movable display module to content associated with an account summary of a different account based on the additional input.

Figure 9:
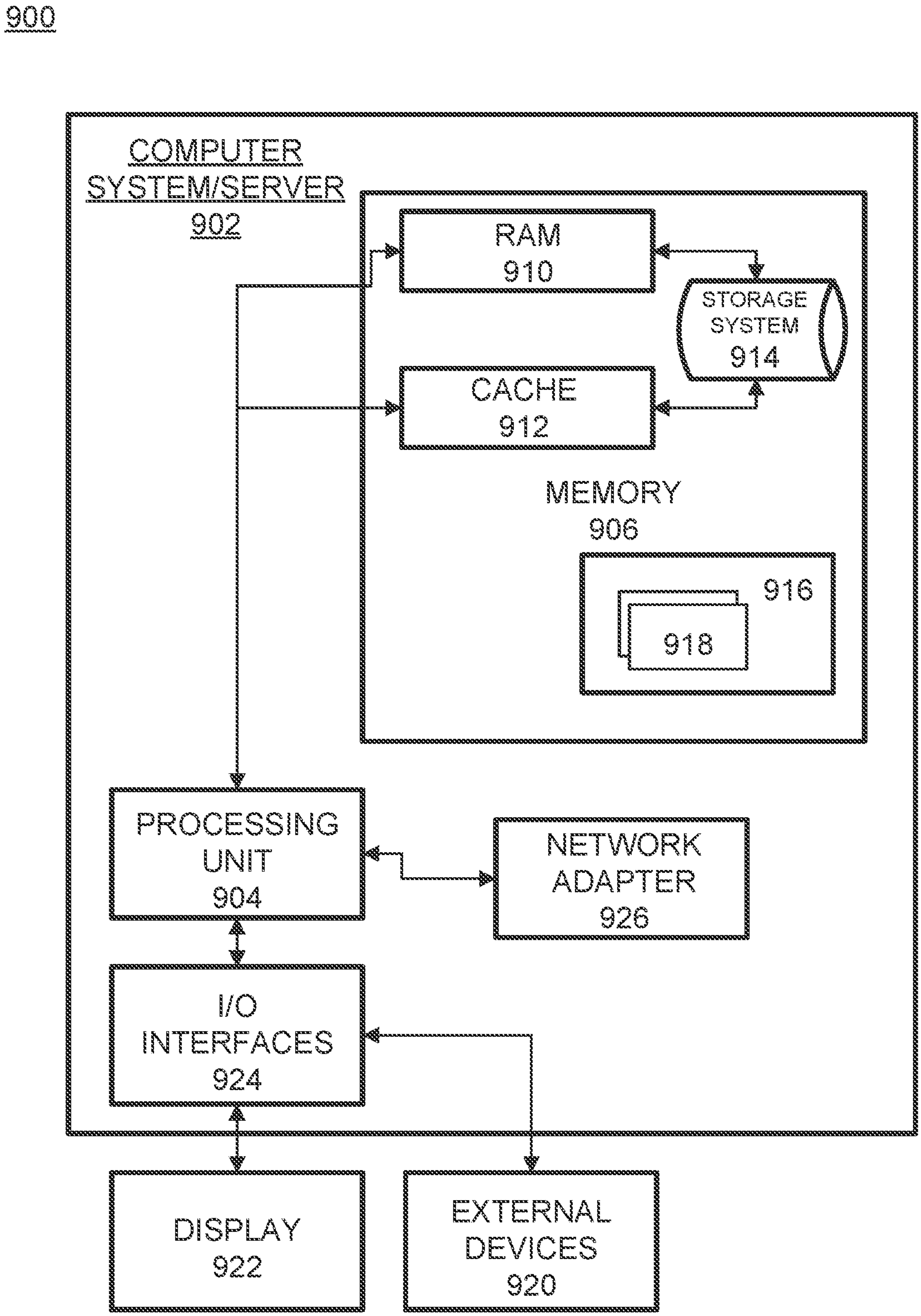
FIG. 9 is a diagram illustrating an example system that supports one or more of the example embodiments.

FIG. 9 illustrates an example system 900 that supports one or more of the example embodiments described and/or depicted herein. The system 900 comprises a computer system/server 902, which is operational with numerous other general-purpose or special-purpose computing system environments or configurations. Examples of well-known computing systems, environments, and/or configurations that may be suitable for use with computer system/server 902 include but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in local and remote computer system storage media, including memory storage devices.

As shown in FIG. 9, computer system/server 902 in cloud computing node 900 is a general-purpose computing device. The components of computer system/server 902 may include but are not limited to, one or more processors or processing units 904, a system memory 906, and a bus that couples various system components, including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks, such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples include, but are not limited to micro-code, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture. They may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations, which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated within modules and embodied in any suitable form, and organized within any suitable type of data structure. The operational data may be collected as a single data set or may be distributed over different locations, including over different storage devices, and may exist, at least partially, merely as electronic signals on a system or network.

It will be readily understood that the application components, as generally described and illustrated in the figures herein, may be arranged and designed in a wide variety of configurations. Thus, the detailed description of the embodiments is not intended to limit the scope of the application as claimed but is merely representative of selected embodiments of the application.

One with ordinary skill in the art will readily understand that the above may be practiced with steps in a different order and/or hardware elements in configurations that are different from those disclosed. Therefore, although the application has been described based upon these preferred embodiments, certain modifications, variations, and alternative constructions would be apparent to those of skill in the art.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:

a processor configured to:

display a dashboard of a software application on a browser of the of a device, wherein the dashboard comprises a plurality of display modules which are displayed at pixel locations previously saved in a database, receive a first command at a first time, modify a position of a first display module within the dashboard to a first different pixel location based on the first command, receive a second command at a second time, modify a respective position of a second display module within the dashboard to a second different pixel location based on the second command, and store the first and second different pixel locations in the database through an application programming interface (API) based on the browser navigating away from the dashboard.

2. The apparatus of claim 1, wherein the processor is configured to display at least one static portion of content in between the plurality of display modules, wherein the at least one static portion of content cannot be moved.

3. The apparatus of claim 1, wherein the processor is configured to remove at least one display module from the dashboard prior to displaying the dashboard based on preferences assigned to the device.

4. The apparatus of claim 1, wherein the processor is configured to persist coordinate positions of the first and second different pixel locations within the browser in response to modifying positions of the first and second display modules, respectively.

5. The apparatus of claim 1, wherein the processor is configured to receive the first and second commands via an application programming interface (API) associated with the dashboard, wherein the API enables the plurality of display modules to change positions on the dashboard.

6. The apparatus of claim 1, wherein the processor is configured to detect an additional input after modifying positions of the first and second display modules, and change display content in the plurality of display modules based on the additional input.

7. The apparatus of claim 1, wherein the processor is further configured to receive a navigation command via the dashboard, and send the first and second different pixel locations to the API of the database when the navigation command is performed.

8. The apparatus of claim 1, wherein the processor is further configured to change what content is shown in at least one of the first and second display modules based on inputs to a menu of the dashboard.

9. The apparatus of claim 1, wherein the processor is configured to modify the position of the first display module and the respective position of the second display module through an API of the dashboard.

10. A method comprising:

displaying a dashboard of a software application on a browser of a device, wherein the dashboard comprises a plurality of display modules which are displayed at pixel locations saved in, a database;

receiving a first command-via the dashboard at a first time;

modifying a position of a first display module within the dashboard to a first different pixel location based on the first command;

receiving a second command at a second time;

modifying a respective position of a second display module within the dashboard to a second different pixel location based on the second command; and storing the first and second different pixel locations in the database through an application programming interface (API) based on the browser navigating away from the dashboard.

11. The method of claim 10, wherein the displaying further comprises displaying at least one static portion of content in between the plurality of display modules, wherein the at least one static portion of content cannot be moved.

12. The method of claim 10, wherein the displaying comprises displaying web content within the dashboard which complies with accessibility standards set forth by Web Content Accessibility Guidelines (WCAG) 2.1.

13. The method of claim 10, wherein the method further comprises removing at least one display module from the dashboard prior to displaying the dashboard based on preferences assigned to the device.

14. The method of claim 10, wherein the method further comprises persisting coordinate positions of the first and second different pixel locations within the browser in response to modifying positions of the first and second display modules, respectively.

15. The method of claim 10, wherein the first and second command are received via an application programming interface (API) associated with the dashboard, wherein the API enables the plurality of display modules to change positions on the dashboard.

16. The method of claim 10, wherein the method further comprises detecting an additional input after modifying positions of the first and second display modules, and changing display content in the plurality of display modules based on the additional input.

17. A computer-readable storage medium comprising instructions which when executed by a processor cause a computer to perform a method comprising:

displaying a dashboard of a software application on a browser of a device, wherein the dashboard comprises a plurality of display modules which are displayed at pixel locations saved in a database;

receiving a first command at a first time;

modifying a position of a first display module within the dashboard to a first different pixel location based on the first command;

receiving a second command at a second time;

modifying a respective position of a second display module within the dashboard to a second different pixel location based on the first command; and storing the first and second different pixel locations in the database through an application programming interface (API) based on the browser navigating away from the dashboard.

18. The computer-readable storage medium of claim 17, wherein the displaying further comprises displaying at least one static portion of content in between the plurality of display modules, wherein the at least one static portion of content cannot be moved.

19. The computer-readable storage medium of claim 17, wherein the displaying comprises displaying web content within the dashboard which complies with accessibility standards set forth by Web Content Accessibility Guidelines (WCAG) 2.1.

20. The computer-readable storage medium of claim 17, wherein the method further comprises removing at least one display module from the dashboard prior to displaying the dashboard based on preferences assigned to the device.

* * * * *